United States Patent
Nakamura et al.

(10) Patent No.: US 6,492,757 B2
(45) Date of Patent: Dec. 10, 2002

(54) STATOR ARRANGEMENT OF ROTARY ELECTRIC MACHINE FOR VEHICLE

(75) Inventors: Shigenobu Nakamura, Anjo (JP); Shinichi Matsubara, Anjo (JP)

(73) Assignee: Denso Corporation, Kariya (JP)

( * ) Notice: Subject to any disclaimer, the term of this patent is extended or adjusted under 35 U.S.C. 154(b) by 1 day.

(21) Appl. No.: 09/773,632

(22) Filed: Feb. 2, 2001

(65) Prior Publication Data

US 2001/0011852 A1 Aug. 9, 2001

(30) Foreign Application Priority Data

Feb. 3, 2000 (JP) ........................................ 2000-026219

(51) Int. Cl.⁷ ................................................ H02K 3/32
(52) U.S. Cl. ........................ 310/180; 310/201; 310/184; 310/179
(58) Field of Search ................................ 310/179, 180, 310/71, 184, 201, 192

(56) References Cited

U.S. PATENT DOCUMENTS

| 5,094,703 A | * | 3/1992 | Takaoka et al. ............ 148/269 |
| 5,965,965 A | | 10/1999 | Umeda et al. |
| 5,998,903 A | | 12/1999 | Umeda et al. |

* cited by examiner

*Primary Examiner*—Burton S. Mullins
(74) *Attorney, Agent, or Firm*—Oliff & Berridge, PLC

(57) ABSTRACT

A rotary electric machine for a vehicle has a stator having a stator winding. The stator winding is made of a plurality of segments. The segments are partly accommodated in a plurality of slots and are arranged to form coil ends groups on both axial sides. The segments are insulated from the stator core by a sheet shaped insulator inserted only along an inner surface of the slot. The segments have bare segments having no insulating layer and covered segments having insulating layer thereon. The bare segments are arranged to surround the covered segments so that the bare segments are not adjacent to the other bare segments in the slots and the coil ends groups.

13 Claims, 6 Drawing Sheets

IX-IX

X-X

STATOR ARRANGEMENT OF ROTARY ELECTRIC MACHINE FOR VEHICLE

CROSS REFERENCE TO RELATED APPLICATION

This application is based on Japanese Patent Application No. 2000-26219 filed on Feb. 3, 2000 the contents of which are incorporated herein by reference.

BACKGROUND OF THE INVENTION

1. Field of Invention

The present invention relates to a stator of a rotary electric machine mounted on a passenger vehicle, truck or the like. Specifically, the present invention prefers to a stator of an alternator for vehicle.

2. Description of Related Art

Engine room capacity of vehicles in recent years has become smaller as the vehicle has changed to a slanted nose configuration to reduce traveling resistance and to maintain space for passengers. Therefore, the environmental temperature of an alternator has increased. Further, increasing an output of the alternator is required in compliance with increasing of various electric loads, such as a safety control device. As a result, heat generated by the alternator has been increasing. Further, erosion and electric short circuiting are facilitated, when a tire splashes the alternator with water, or when the alternator has water poured on it when the engine room is washed and the like. In cold regions water may contain an anti-freezing agent that is an electrolytic solution. Of course, there is also a requirement to cut costs while maintaining temperature reduction and durability against an environment.

In consideration of the above-mentioned circumstances, the applicant filed JP-B-2927288 and U.S. Pat. No. 5,998,903 that disclose an alternator that has a winding using a plurality of hairpin shaped segments made of an electric conductor. This winding is assembled by inserting the segments into slots of a stator core and joining the segments. In this arrangement, it is possible to reduce resistance of the winding by increasing a space factor of the winding in the slots and to achieve a decrease in temperature and an increase in output. Further, the alternator has insulators having a S-shaped radial cross-section. The S-shaped insulator is disposed between the segments in the slot and between the segments and the slot to eliminate an insulating layer on the segment surface. Therefore, the segments decrease costs.

However, it is difficult to insert the segments wrapped in the S-shaped insulators into the slot. Therefore, the assembling process is complicated. On the other hand, to increase the space factor is not as easy as expected, because it is necessary to prevent the undesirable movement of the insulator between the segments when the segments are inserted after inserting the insulators into the slot.

SUMMARY OF THE INVENTION

The present invention addresses these drawbacks by providing an improved stator arrangement.

It is therefore an object of this invention to provide an improved stator of a rotary electric machine for a vehicle.

It is a further object of this invention to provide a stator of a rotary electric machine for a vehicle which is capable of improving the assembly process.

It is another object of this invention to provide a stator of a rotary electric machine for a vehicle which is capable of improving a space factor.

It is a still further object of this invention to provide a stator of a rotary electric machine for a vehicle which is capable of improving durability against the environment.

According to a first aspect of the present invention, the stator of the rotary electric machine for a vehicle comprises a stator core having a plurality of slots, a poly-phase stator winding disposed in the slots and an insulator insulating between the slots and the stator winding. The stator winding comprises a plurality of segments having covered segments, each covered with an insulating layer, and bare segments have no insulating layer. The bare segments are adjacent to only the covered segments in the slots.

Although the bare segment is disposed in the slot, it is possible to insulate the segments in the slots from each other.

The segments may be formed in at least a substantial U-shape. The segments extend from both axial sides of the stator core to form first and second coil ends groups. The first coil ends have turn portions of the U-shaped segments. The second coil ends have a plurality of joining portions joining a pair of ends of the different U-shaped segments extending from the slots spaced apart at a predetermined pitch each other.

The turn portions may have small turn portions surrounding no other turn portions, which are provided by the covered segments. The segment having the small turn portion has a pair of straight portions disposed in the slots that are adjacent to the other straight portions belonging to the other segment having the small turn portion. It is possible to insulate the segments having the small turn portions even if the bare segments are used in the stator winding.

The turn portions may comprise first turn portions which is the smallest, second turn portions surrounding the first turn portions, third turn portions surrounding the second turn portions and forth turn portions surrounding the third turn portions. The covered segments provide the first and third turn portions. The bare segments provide the second and forth turn portions. In this arrangement, the bare segments are not adjacent to each other in both of the slots and the coil ends groups.

The turn portions may have small turn portions provided by the covered segments and large turn portions provided by the bare segments surrounding the small turn portions.

The turn portions may have a pair of the small turn portions provided by the covered segments being arranged side by side in a radial direction of the stator core and the large turn portions provided by the bare segments surrounding them.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
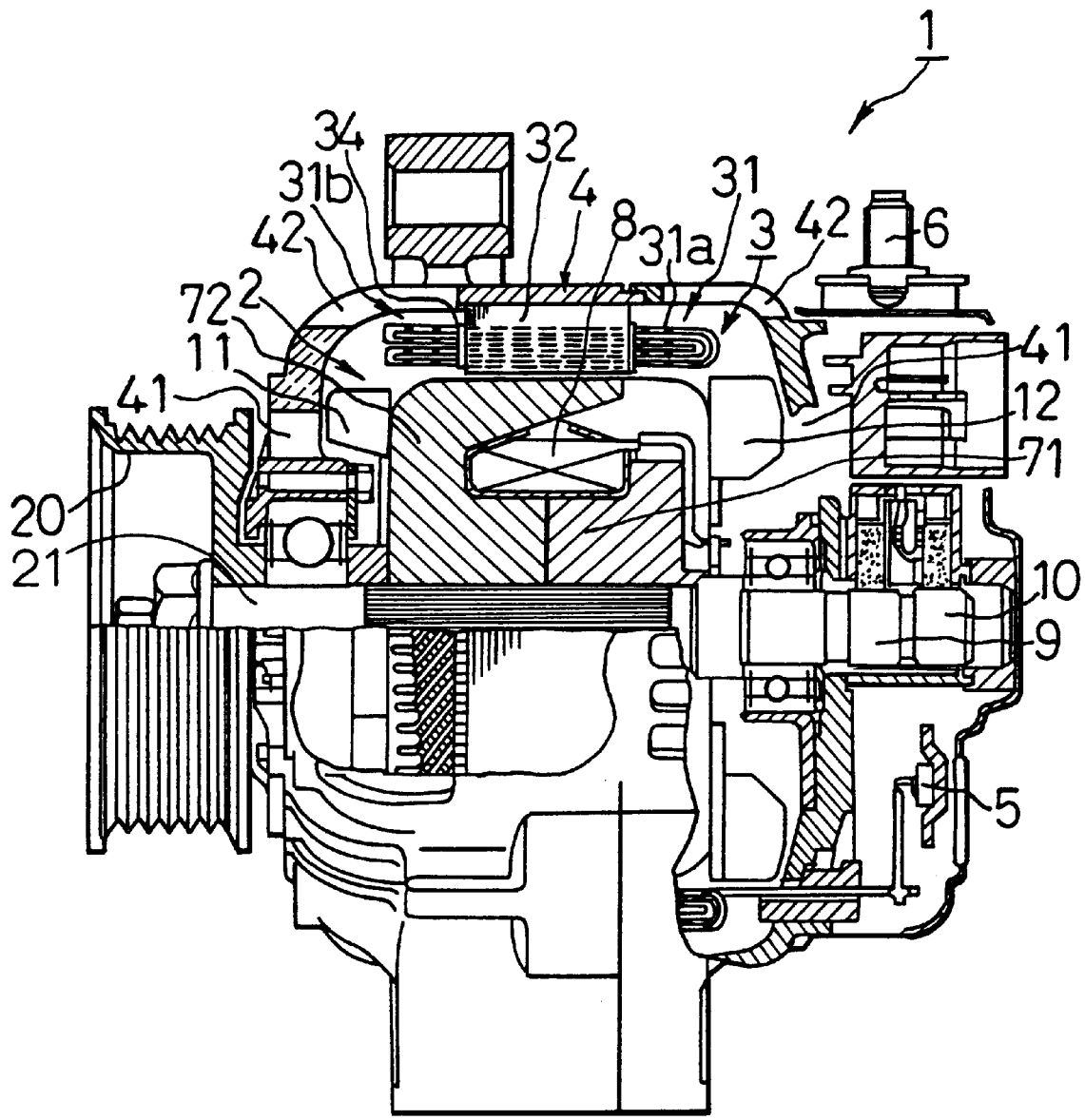
FIG. 1 is a sectional view of an alternator for a vehicle according to a first embodiment of the present invention.
Figure 2:
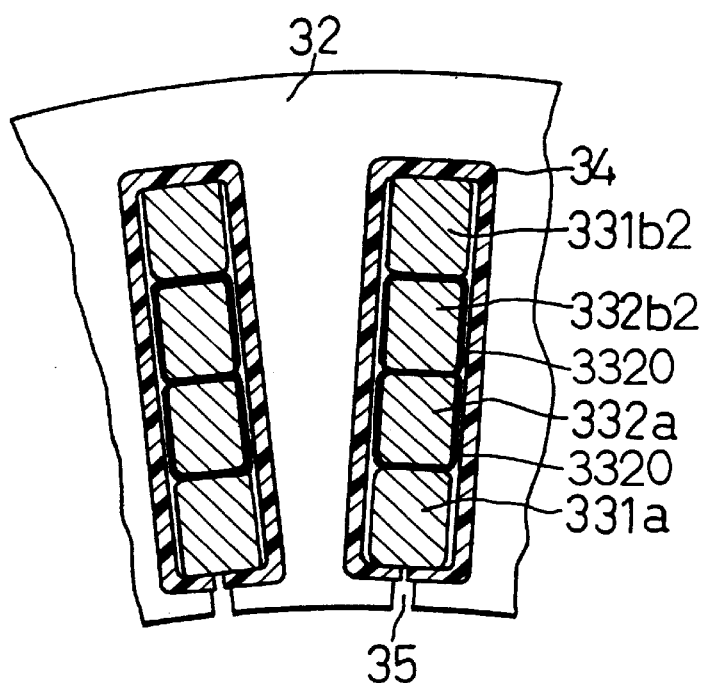
FIG. 2 is a sectional view of the stator showing an arrangement of segments and an insulator in slots according to the first embodiment of the present invention.
Figure 3:
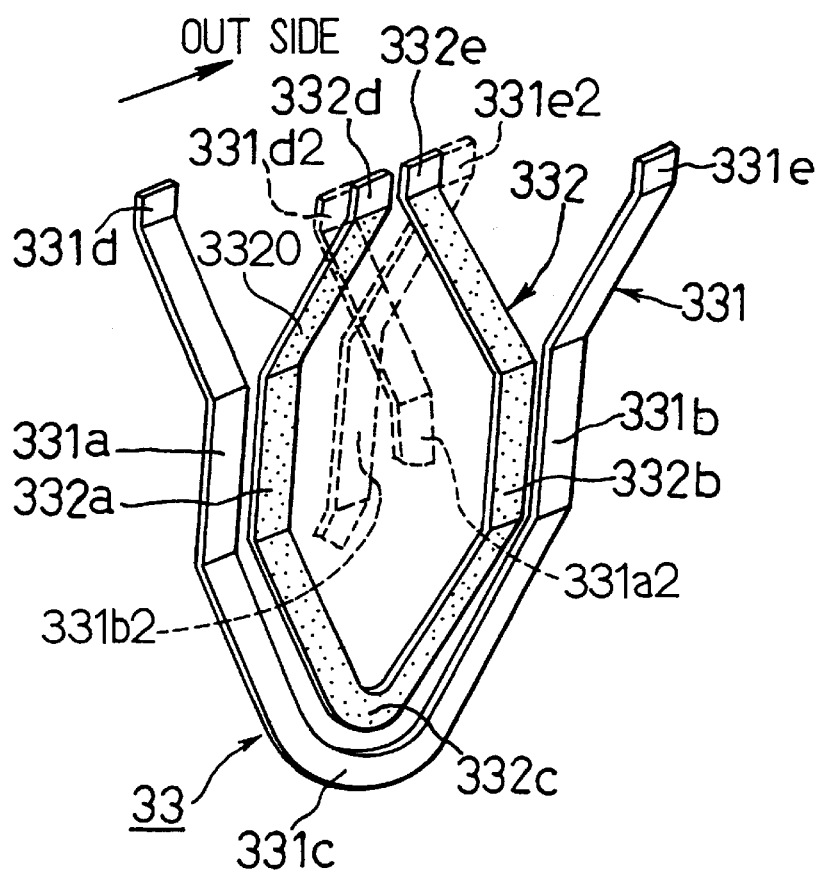
FIG. 3 is a perspective view of the segments according to the first embodiment of the present invention.
Figure 4:
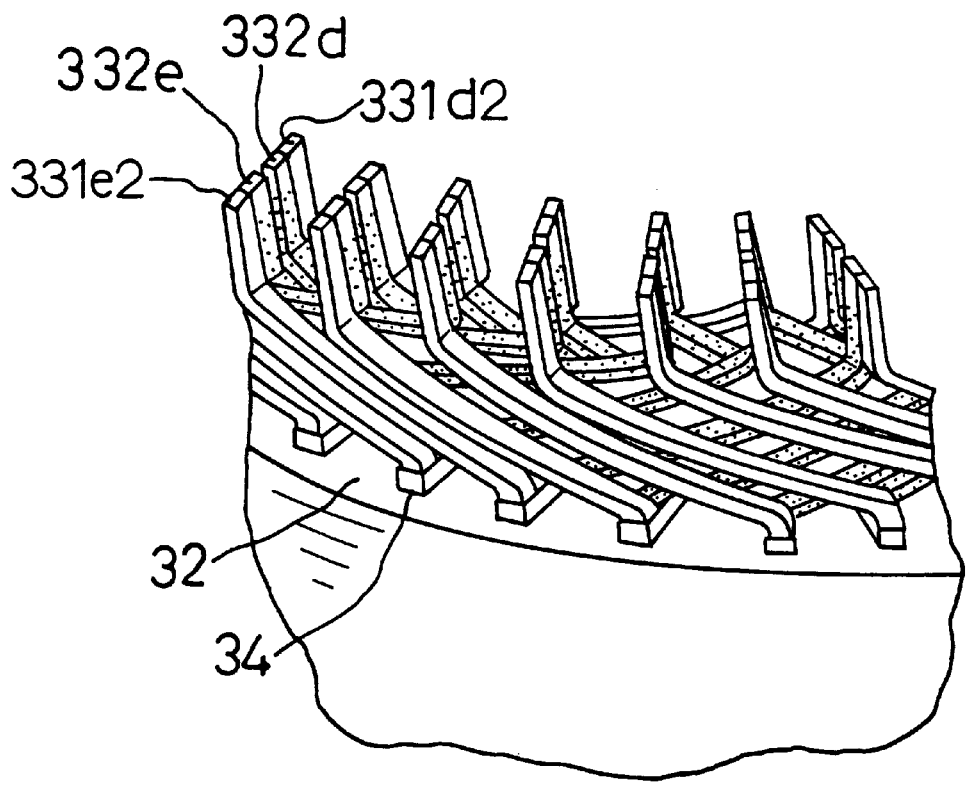
FIG. 4 is a perspective view of the coil end according to the first embodiment of the present invention.

An alternator for a vehicle according to a first embodiment of the present invention is described with reference to the drawings. FIGS. 1 through 4 show a first embodiment of the present invention. FIG. 1 is a cross sectional view showing a general structure of the alternator. FIG. 2 is a cross sectional view of a stator. FIG. 3 is a perspective view showing a unit of segments. FIG. 4 is a perspective view showing a coil ends group of a joining side.

The alternator 1 has a shaft 21 rotatably supported on a frame 4. A pulley 20 driven by an engine is fixed on a front end of the shaft 21. A rotor 2 and slip rings 9 and 10 are fixed on the shaft 21. The rotor 2 has a pair of pole cores 71 and 72 and a field winding 8 connected to the slip rings 9 and 10. Each of the pole cores 71 and 72 provides eight magnetic poles. Cooling fans 11 and 12 are disposed on both sides of the rotor 2.

A stator 3 is supported on the frame 4 having a cylindrical stator core 32 and a stator winding 31. The stator core 32 is located opposite to the magnetic poles of the rotor 2. The stator core 32 has a plurality of slots. The stator winding 31 has a portion accommodated in the slots, a first coil ends group 31a and a second coil ends group 31b. The stator winding 31 includes a pair of three-phase windings.

The frame 4 has a pair of axial inlet openings 41 located on front and rear side walls and a pair of radial outlet openings 42 located on a radial outside of the first and second coil ends groups 31a and 31b. The frame 4 supports a control member 5 having a three-phase rectifier and an output terminal 6.

When the engine rotates the pulley 20, field current is supplied to the field winding 8 through the slip rings 9 and 10. The rotor 2 rotates and generates rotating magnetic field to induce an AC current on the stator winding 31. The induced current on the stator winding 31 is rectified by the member 5 and supplied as a DC power through the output terminal 6. The cooling fan 11 generates cooling wind flowing through the second coil ends group 31b. The cooling fan 12 generates cooling wind flowing through the first coil ends group 31a.

As shown in FIG. 2, the stator core 32 has a plurality of slots 35 on a radial inner side. In this embodiment, the stator core 32 has ninety-six slots 35. The slots 35 are located at even intervals. The slot has axial openings on both sides of the stator core 32 and an axially extending slit-shaped radial opening. Each of the slots 35 accommodates a plurality of conductors as the stator winding 31. Straight portions of segments 33 provide the conductors in the slots 35. The segments 33 are a piece of copper wire having a flat cross section. In this embodiment, the stator winding has four turns (4T) per slot.

Each of the slots 35 also accommodates a sheet-shaped insulator 34 which is inserted between the conductors in the slots and an inner surface of the slots of the stator core 32 to insulate therebetween.

In this embodiment, four conductors are accommodated in each slot 35 to form a single row in the radial direction. A conductor 332a in an inner middle layer and a conductor 332b in an outer middle layer are made of covered conductors having insulating layers 3320. A conductor 331a in an inner most layer and a conductor 331b2 in an outer most layer are made of bare conductors having no insulating layers. Therefore, the bare conductor is adjacent only to the covered conductors, is not adjacent to the other bare conductors in the slots.

One of the conductors in a first slot 35 and another one of the conductors in a second slot 35 which is spaced apart a predetermined magnetic pole pitch from the first slot 35 make a pair. For instance, the conductor 331a in the innermost layer of the first slot 35 makes a pair with the conductor 331b in the outermost layer of the second slot 35 which is spaced apart a magnetic pole pitch in the clock wise direction. In this manner, the conductor 332a in the inner middle layer of the first slot 35 makes a pair with the conductor 332b in the outer middle layer of the second slot 35 which is spaced apart a magnetic pole pitch in the clock wise direction. A turn portion 331c at an axial end of the stator core 32 connects the paired conductors 331a and 331b. A turn portion 332c connects the paired conductors 332a and 332b.

That is, as shown in FIG. 3, the conductor 331a, the turn portion 331c and the conductor 331b are provided by a large segment 331 which is formed U-shape. The conductor 332a, the turn portion 332c and the conductor 332b are provided by a small segment 332 which is formed U-shape. The large segment 331 and the small segment 332 form a unit of the segment 33. The turn portion 331c of the large segment 331 is arranged to surround the turn portion 332c of the small segment 332. The turn portions 331c and 332c form the first coil ends group 31a. The large segments 331 and the small segments 332 are spaced apart a predetermined gap in the first coil ends group 31a.

As a result, each of the small segments 332 has two inclined portions crossing the other inclined portions in the first coil ends group 31a. Each of the large segments 331 also has two inclined portions. However, the inclined portions of the large segments 331 do not cross the other inclined portions in the first coil ends groups 31a.

Further, the conductor 332a in the inner middle layer of the first slot 35 makes a pair with the conductor 331a2 in the inner most layer of the second slot 35 which is spaced apart at a magnetic pole pitch in the clock wise direction. In this manner, the conductor 331b2 in the outer most layer of the first slot 35 makes a pair with the conductor 332b in the outer middle layer of the second slot 35 which is spaced apart at a magnetic pole pitch in the clock wise direction.

These conductors extend from the other side of the stator core to form the second coil ends group 31b. An end 331e2 of the conductor in the outer most layer and an end 332e of the conductor in the outer middle layer are joined to form an outer joining portion. An end 332d of the conductor in the inner middle layer and an end 331d2 of the conductor in the inner most layer are joined to form an inner joining portion. The inner joining portion and the outer joining portion are arranged in the radial direction with a predetermined gap. The ends may be joined by a known joining method such as a welding, supersonic welding, arc welding and brazing.

As a result, each of the small segments 332 has two inclined portions crossing the other inclined portions disposed on adjacent layers in the second coil ends group 31b. Each of the large segments 331 also has two inclined portions crossing the other inclined portions disposed on an adjacent layer in the second coil ends group 31b.

As shown in FIG. 2, the large segments 331 are the bare segments made of a bare conductor wire. The small segments 332 surround no other segments. The small segments 332 are the covered segments covered with an insulating layer 3320. The insulating layers 3320 are only removed at the joining portion. The bare segments 331 are adjacent to only the covered segments in the coil ends. The bare segments 331 are arranged to surround the covered segments 332 so that the bare segments 331 are not adjacent to the other bare segments 331 in both the slots and the coil ends groups in the radial direction.

The stator winding may have a limited number of irregular shaped segments such as I-shaped and middle size U-shaped segments for providing connector leads such as output leads, neutral connector leads and jumper connector leads. The covered segments of the connector leads prevent a short circuit. The stator winding may be covered with an insulating resin that is applied after an assembling process and a joining process of the segments.

The insulating layer 3320 insulates between the conductors in the inner middle and outer middle layer. The insulating layer 3320 also insulates between the conductors in the inner middle and inner most layer and between the conductors in the outer middle and outer most layer. The insulators 34 insulate the conductors in the slots 35 from the stator core 32.

Although the small segments 332 has a plurality of crossings with the other segments 331 and 332 in the coil ends groups 31a and 31b, the insulating layer 3320 insulates between them. Therefore, the insulating layer 3320 can insulate between the conductors in both the slots 35 and the coil ends groups 31a and 31b. In this embodiment, it is possible to decrease an amount of insulating material on the segments.

Second Embodiment

Figure 5:
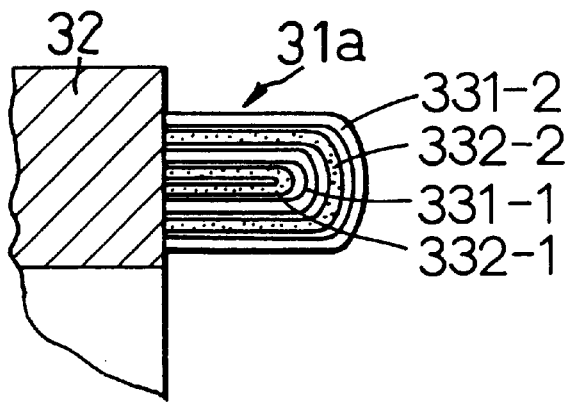
FIG. 5 is a sectional view of the stator showing an arrangement of the segments according to a second embodiment of the present invention.

An alternator according to a second embodiment is described with reference to FIG. 5 showing a radial arrangement of the segments. The stator winding has eight layered conductors in the slots 35 of the stator core 32. The first coil ends group 31a is formed by multi layered turn portions.

A smallest segment provides a first turn portion 332-1, which is smallest. A second turn portion 331-1, which is comprised of a second segment, surrounds the first segment and turn portion 332-1. A third turn portion 332-2, which is comprised of a third segment, surrounds the second segment and turn portion 331-1. A fourth turn portion 331-2, which is comprised of a fourth segment, surrounds the third segment and turn portion 332-2. The first and third segments are the covered segments 332 having insulating layers. The second and fourth segments are the bare segments 331 made of bare wires. The bare segments 331 and the covered segments 332 are alternately arranged at their turn portions 332-1, 331-1, 332-2 and 331-2.

The first segments and the second segments may form a similar winding to the first embodiment. The third segments and the fourth segments may also form a similar winding to the first embodiment. These windings are connected in series to form a three-phase winding having eight turns per slot. In this manner, a winding that has multiples of four turns can be provided by adding larger segments. In this embodiment, it is possible to insulate between the conductors.

Third Embodiment

Figure 6:
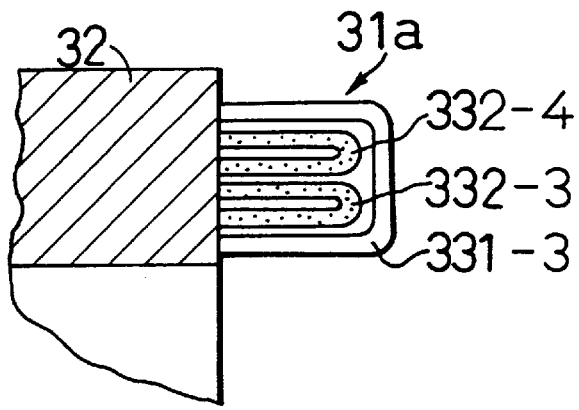
FIG. 6 is a sectional view of the stator showing an arrangement of the segments according to a third embodiment of the present invention.

An alternator according to a third embodiment is described with reference to FIG. 6 showing a radial arrangement of the segments. The stator winding has six layered conductors in the slots 35 of the stator core 32. The stator winding is mainly made of a plurality of segment units. A segment unit has two small segments arranged in parallel that has two turn portions 332-3 and 332-4. The segment unit also has a large segment surrounding both of the small segments and includes a large turn portion 331-3. In a radial cross section view of the first coil ends group 31a, two small turn portions 332-3 and 332-4 are arranged side by side in the radial direction of the stator core. The turn portion 331-3 surrounds two turn portions 332-3 and 332-4. The small segments having the turn portions 332-3 and 332-4 are the covered segments 332. The large segments having the turn portions 331-3 are the bare segments 331. In this arrangement, although the large segments 331 don't have insulating layers, the small segments 332 provide insulation between the conductors in the slots 35 and in the coil ends groups.

Fourth Embodiment

Figure 7:
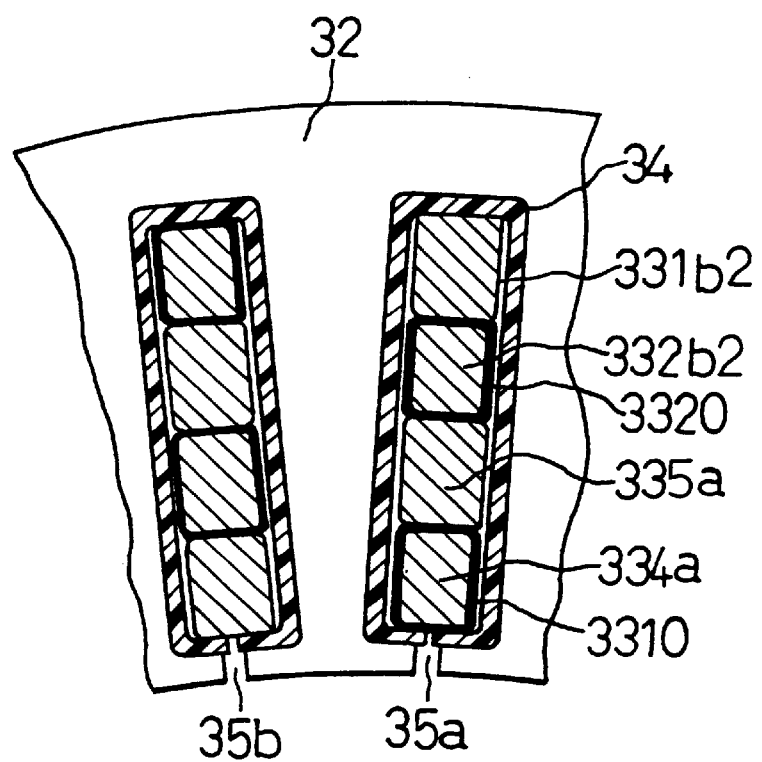
FIG. 7 is a sectional view of the stator showing an arrangement of the segments and the insulator in the slots according to a forth embodiment of the present invention.

FIG. 7 shows a radial arrangement of the conductors in the slots 35a and 35b of a fourth embodiment. The slot 35a has four layered conductors 334a, 335a, 331b2 and 332b2. The large, covered segment 334 includes the conductor 334a having an insulating layer 3310. The small, bare segment 335 includes the conductors 335a. The small, covered segment 332 also includes the conductor 332b2 having an insulating layer 3320. The large, bare segment 331 also includes the conductor 331b2. Therefore, the slot alternately accommodates the bare segments and the covered segments in the radial direction. Further, the slot 35b that is adjacent the slot 35a has a reverse arrangement of the bare conductors and the covered conductors.

In this arrangement, the bare segments are adjacent to only the covered segments in the slots. Although the bare segments are adjacent to, and cross with, the other bare segments in the second coil ends group 31b, the gaps between the conductors formed in the coil ends group insulate between the bare segments. The reverse arrangement of the conductors in the adjacent slots improves insulation between the segments arranged circumferentially in the first and second coil ends groups.

Fifth Embodiment

Figure 8:
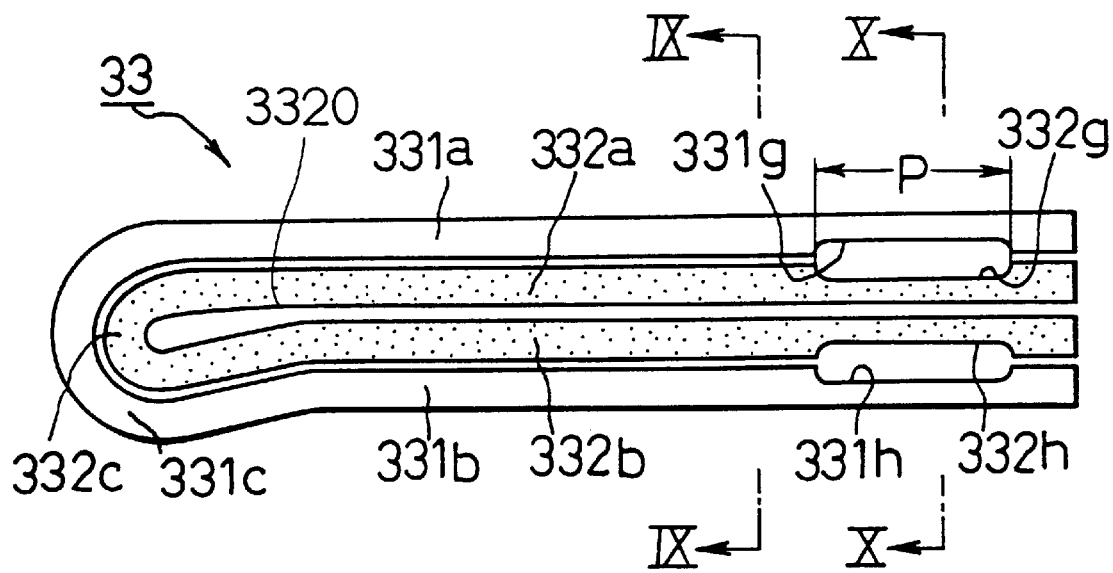
FIG. 8 is a plan view of the segments according to a fifth embodiment of the present invention.
Figure 9:
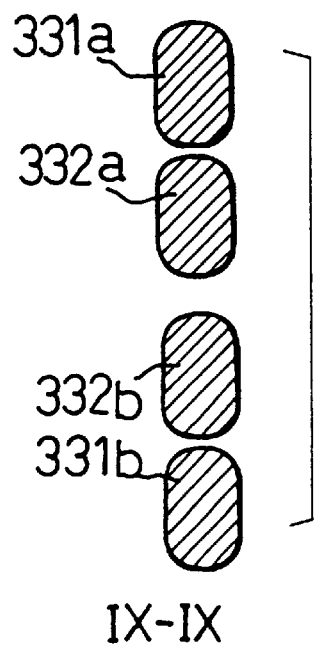
FIG. 9 is a sectional view at IX—IX of FIG. 8.
Figure 10:
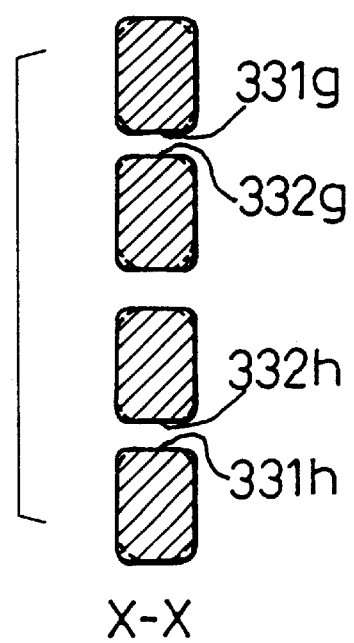
FIG. 10 is a sectional view at X—X of FIG. 8.

An alternator according to a fifth embodiment is described with reference to FIGS. 8 through 10, and show a unit of the segments. The segments have depressions 331g, 332g, 331h and 332h forming wider gaps between the conductors in the second coil ends group 31b compared to a distance between the segments in the slots. The depressions are pressed. The depressions extend through a region P in which the conductors may cross each other in the second coil ends group. The depressions improve insulation between the conductors in the second coil ends group. The segments 331 and 332 may have at least one of the depressions 331g and 332g and at least one of the depressions 331h and 332h.

Sixth Embodiment

Figure 11:
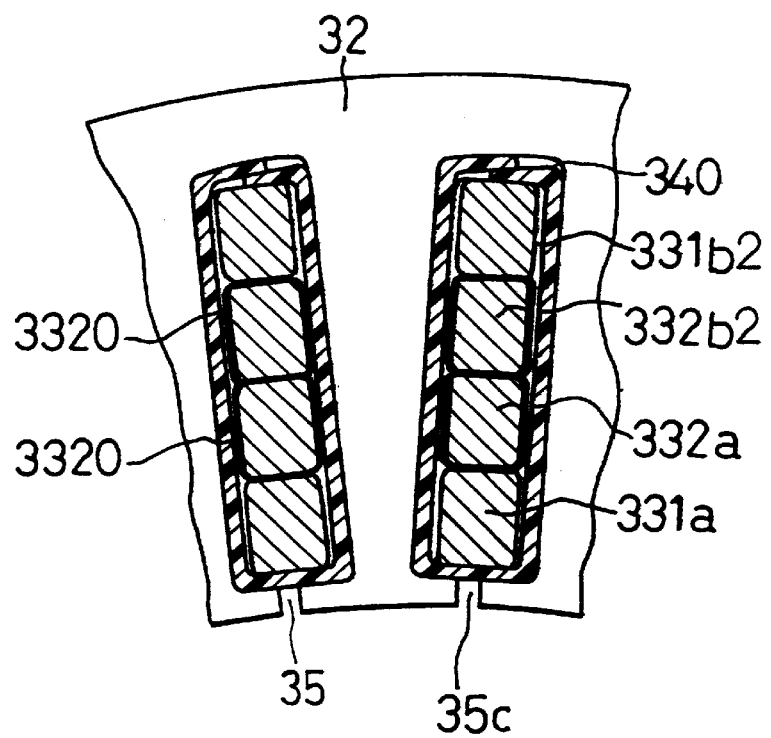
FIG. 11 is a sectional view of the stator showing an arrangement of the segments and the insulator in the slots according to a sixth embodiment of the present invention.

An alternator according to a sixth embodiment is described with reference to FIG. 11. In this embodiment, the sheet shaped insulator 340 is formed into a cylindrical shape to wrap the conductors in the slots. The insulator 340 is a rectangular sheet that has overlapped ends located on a radial outside of the slots. The overlapped ends are placed on an inner surface of the slots, and disposed between the conductor and the inner surface of the slot. The insulator 340 protects the conductors in the slots from water or foreign matter by closing the axially extending opening 35c of the slot.

Seventh Embodiment

Figure 12:
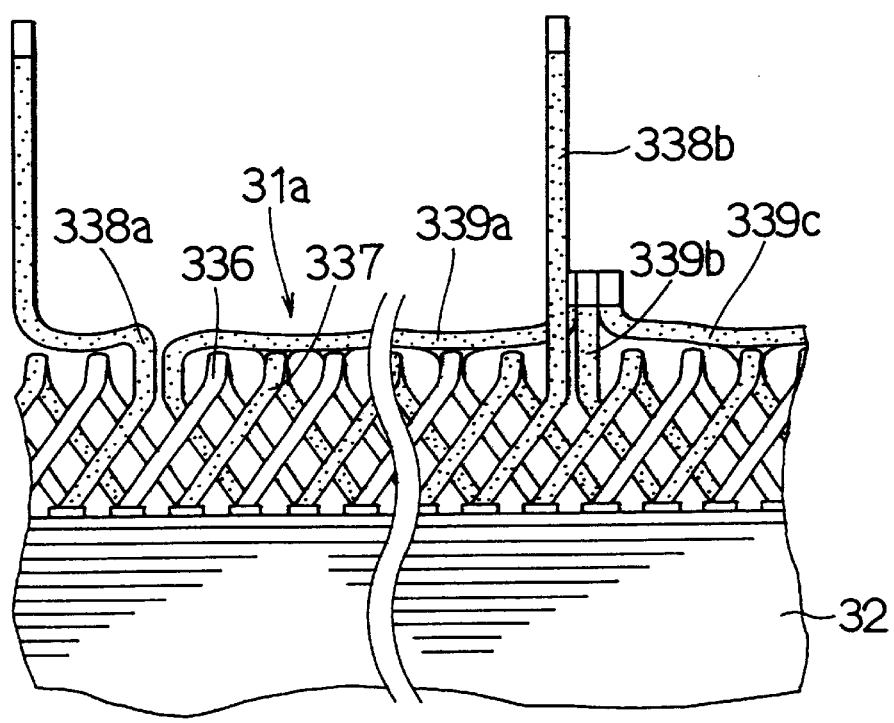
FIG. 12 is a partial plan view of the stator according to a seventh embodiment of the present invention.

FIG. 12 shows a partial outside view of the stator of a seventh embodiment. The stator has a stator core 32 having forty-eight slots and a stator winding having single three-phase winding. This embodiment has two layered conductors in the slots. The winding is made of a plurality of segments having U-shaped regular segments as the majority and irregular segments. The regular segments have the bare segments 336 and the covered segments 337 that are alternately arranged in a circumferential direction. The irregular segments have a shape different from the regular segments for providing leads such as output leads, neutral connector leads of the three-phase winding and jumper connector leads. As shown in FIG. 12, segments 338a and 338b provide output leads to be connected with the rectifier 5, and segments 339a, 339b and 339c provide neutral connector leads on the first coil ends group 31a. The irregular segments 338b and 339b are irregular not only in shape but also in arrangement. The irregular segments 338b and 339b are located irregularly to interrupt an alternating arrangement of the regular segments. These segments 338a, 338b, 339a, 339b and 339c are the covered segments for preventing short-circuiting with the bare segments 336.

Likewise, the above-described embodiments have the similar leads provided by the covered segments. Further, since the above-described embodiments have more than four conductors in the slots, they have some jumper connector leads provided by U-shaped covered segments. Although, the irregular shaped segments require an irregular arrangement of the conductors in the slots and the coil ends groups, the irregular shaped segments made of the covered segments prevent short-circuiting.

The stator may have specific number of slots that corresponds to the number of the magnetic poles of the rotor. The segments may have a circular cross section. For instance, the segments may have a flat cross section on the straight portions 331a, 331b, 332a and 332b to be accommodated in the slots and a circular cross section on the other portions. The present invention may apply to a generator, a motor or a rotary electric machine that selectively acts as the generator and the motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A stator of a rotary electric machine for a vehicle, comprising:

a stator core having a plurality of slots;

a poly-phase stator winding disposed in the slots; and an insulator between the slots and the stator winding, wherein the stator winding comprises a plurality of segments having covered segments each covered with an insulating layer and bare segments having no insulating layer, and the bare segments are adjacent to only the covered segments in the slots.

2. The stator of the rotary electric machine for a vehicle according to claim 1, wherein the segments form a substantial U-shape, and the segments extend from both axial sides of the stator core to form first coil ends group having turn portions of the segments and second coil ends group having a plurality of joining portions joining a pair of ends of the segments extending from the slots and spaced apart from each other at a predetermined pitch.

3. The stator of the rotary electric machine for a vehicle according to claim 2, wherein the turn portions have small turn portions surrounding no other turn portions, and the small turn portions comprise the covered segments.

4. The stator of the rotary electric machine for a vehicle according to claim 3, wherein the turn portions comprise first turn portions which are the smallest, second turn portions surrounding the first turn portions, third turn portions surrounding the second turn portions and fourth turn portions surrounding the third turn portions, the first and third turn portions are comprised of the covered segments and the second and fourth turn portions are comprised of the bare segments.

5. The stator of the rotary electric machine for a vehicle according to claim 3, wherein the turn portions have large turn portions surrounding the small turn portions, and the large turn portions are comprised of the bare segments.

6. The stator of the rotary electric machine for a vehicle according to claim 3, wherein the large turn portions surround a pair of the small turn portions arranged side by side in a radial direction of the stator core.

7. The stator of the rotary electric machine for a vehicle according to claim 1, wherein one of the covered segments is adjacent to the other one of the covered segments in the slots.

8. The stator of the rotary electric machine for a vehicle according to claim 1, wherein the covered segments and the bare segments are alternately arranged in the slots.

9. The stator of the rotary electric machine for a vehicle according to claim 1, wherein the segments extend from both axial sides of the stator core to form a coil ends group, and the segments are spaced apart a predetermined distance in the coil ends group.

10. The stator of the rotary electric machine for a vehicle according to claim 9, wherein a portion of the segments is formed to provide a distance between the segments in the coil ends group that is greater than the distance between a remaining portion of the segments in the slots.

11. The stator of the rotary electric machine for a vehicle according to claim 1, wherein the insulator is a sheet having ends, the ends overlap with each other on an inner surface of the slots and the insulator closes an axially extended opening of the slots.

12. The stator of the rotary electric machine for a vehicle according to claim 1, wherein the segments extend from both axial sides of the stator core to form a coil ends group, and the bare segments are adjacent to only the covered segments in the coil ends group.

13. The stator of the rotary electric machine for a vehicle according to claim 1, wherein at least one of the covered segments provides a lead.

* * * * *